May 28, 1935.  H. D. STECHER  2,002,839
HOSE COUPLING
Filed June 24, 1933
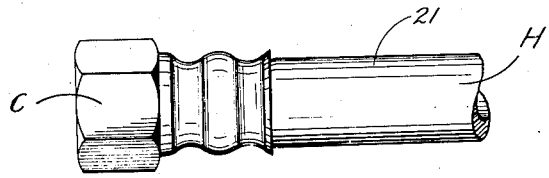
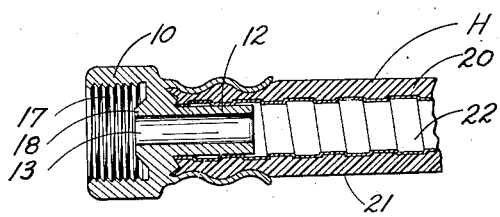
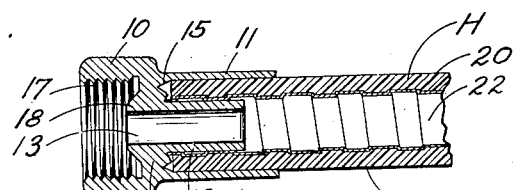
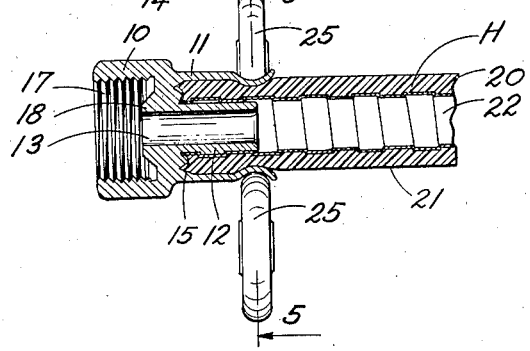
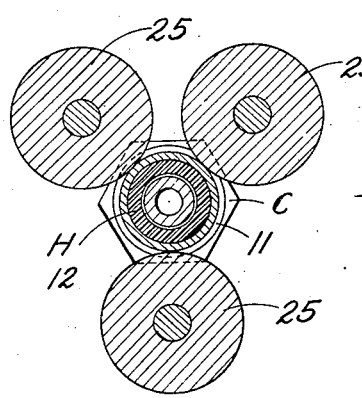
Inventor
HENRY D. STECHER
By Richey & Watts
Attorneys Patented May 28, 1935

2,002,839

UNITED STATES PATENT OFFICE 2,002,839

HOSE COUPLING

Henry D. Stecher, Lakewood, Ohio, assignor to The Weatherhead Company, Cleveland, Ohio, a corporation of Ohio Application June 24, 1933, Serial No. 677,421

7 Claims. (Cl. 285—84)

This invention relates to hose couplings and to a method of attaching such couplings to hose ends. In its preferred form, the invention relates to a coupling for a hose having a metallic or fabric lining and to a method for securing such hose to the coupling.

In connection with couplings such as are employed in high pressure oil hoses for motor cars and for automobile gasoline lines, difficulties have arisen because of the fact that the fluid carried by the hose has been able to reach the cut end of the hose and thus penetrate the fabric covering of the hose or the fabric which may be incorporated in the hose construction. The difficulties have been particularly pronounced in connection with hoses of the types embodying spiral metallic or braided fabric linings and a rubber or rubber and fabric covering, where it is impossible to make a pressure seal with the interior of the hose. In such hoses, the fluid may follow the convolutions of the metallic lining or the interstices of the fabric and thus reach the cut end of the hose. Unless the end of the hose is properly sealed, the fluid may escape through the outer fabric covering, or penetrate the fabric embodied in the walls of the hose and thus damage the hose.

Accordingly, it is among the objects of my invention to provide a hose coupling and a method of attaching a hose to the coupling which will prevent fluid from penetrating or escaping around the end of the hose. Another object of my invention is to provide secure, permanent, leak-proof, and economical coupling. A further object is to provide a coupling for a hose having a spiral metallic or woven fabric lining, which will effect a permanent mechanical joint and a leak-proof fluid joint. Other objects of my invention will be apparent from the following description of a preferred form thereof, reference being had to the accompanying drawing. The essential characteristics are summarized in the claims.

In the drawing:

Figure 1 illustrates a complete coupling made according to my invention;

Fig. 2 is a longitudinal section through the hose and coupling illustrated in Fig. 1;

Fig. 3 illustrates the first step in securing a hose to my coupling, the hose merely being inserted into the sleeve of the coupling;

Fig. 4 illustrates the method employed in rolling or spinning in the sleeve of the coupling to secure the hose to the coupling; and Fig. 5 is a section taken along line 5—5 of Fig. 4.

As shown in the drawing, the coupling C comprises a body portion 10 having an integrally formed sleeve 11 projecting therefrom. Extending from the body portion in the same direction as the sleeve and concentric therewith, I preferably provide a nipple 12 which is adapted to extend into the interior passageway of the hose H and which may have a passageway 13 therein. The nipple and the sleeve together form an annular chamber which is adapted to receive the end of the hose. The bottom of the annular chamber is defined by the end wall 14 of the body portion of the coupling. The end wall is preferably provided with a V-shaped annular recess 15 for a purpose to be hereinafter described.

The body portion of the coupling at the end opposite the sleeve and nipple may be provided with any convenient means for connecting the coupling to a part of a motor car or to a copper tube. For example, as illustrated in the drawing, the coupling may be provided with an internally threaded recess 17 having a conical seat at the base thereof and adapted for connection to a flared copper tube. This type of seat and the formation of the recess in the coupling is fully described in the Weatherhead Patent No. 1,733,925 and will not be discussed further herein.

In the drawing, the hose H is illustrated as having a rubber or other non-metallic body 20, a fabric covering 21, and a spirally wound internally disposed flexible metallic sheath or lining 22 with or without a layer of fabric between the metallic sheath and the rubber body. It is to be understood, however, that my invention is equally applicable to fabric lined hose or other types of hose.

In order to make a secure mechanical joint between the hose and the coupling and likewise to produce a fluid tight joint between the hose and the coupling and prevent fluid from escaping past the end of the hose, I preferably spin or roll the sleeve of the coupling into engagement with the hose somewhat in the manner disclosed in the co-pending application of Albert J. Weatherhead, Jr., Serial No. 581,893, filed December 18, 1931. In that application, there is disclosed a coupling similar to the one illustrated herein except that the end wall of the body portion of the coupling against which the end of the hose abuts is plane, and a method of spinning or rolling in the sleeve to compress the hose between the sleeve and the nipple and to crowd the end of the hose against the end wall of the body portion is also disclosed. In that application, the sleeve is spun or rolled into the hose in only one zone.

I have found that a type of coupling superior for some purposes, such as high pressure applications, is produced by forming the coupling, as disclosed herein, with an annular recess in the end wall, and by rolling or spinning the sleeve into the hose in two zones, one adjacent the open end of the sleeve and the other adjacent the body portion of the coupling.

As illustrated in Fig. 4, the first rolling in operation takes place adjacent the open end of the sleeve. The operation may be carried out by means of a series of rolls 25, as illustrated in Figs. 4 and 5, or if desired the sleeve may be spun into the hose instead of being rolled. The spinning or rolling operations are fully described in the above noted Weatherhead application Serial No. 581,893. The first rolling in operation compresses the hose against its internal metallic lining and forces the lining firmly into engagement with the nipple 12, and also longitudinally crowds the material of the hose against the end wall 14 and causes the material to flow slightly into the annular recess 15.

Thereafter the joint between the hose and coupling is completed by rolling in the sleeve in a zone adjacent the body portion of the coupling. It is to be noted that the end wall preferably lies within the sleeve, while the bottom of the V-shaped recess may be disposed substantially in the plane defined by the juncture of the sleeve with the hexagonal body portion of the coupling. By reason of this arrangement, the second rolling in operation not only applies further pressure to the material of the hose, which is already somewhat compressed by the first rolling in operation, but also deforms the annular recess 15 by swinging together the walls of the V, thereby pinching the material of the hose between the walls of the V to make a secure and leak-proof joint between the end wall and the hose. When the second rolling in operation takes place, the hose is already securely clamped by the first rolling in operation so that the material can not flow away from the end wall but must be compressed thereagainst. By this method, the material of the hose adjacent the body portion of the coupling is compressed to such an extent that no fluid can escape around or penetrate the end of the hose. Thus a tight joint is produced even though the end of the hose may be badly out of square so that only a part touches the end wall before closing in. The groove in the end wall permits a relatively large radial movement of the sleeve, which results in a correspondingly great displacement and compression of the material of the hose.

From the foregoing description of a preferred form of my invention, it will be seen that I have provided a simple coupling which can be easily and rapidly manufactured by automatic screw machine operations. I have also provided a method of securing a hose to a coupling which can be rapidly carried out and which will form a secure mechanical joint between the hose and the coupling and will also form a leak-proof fluid tight joint. By reason of the high degree of compression in the material of the hose adjacent the body portion of the coupling, fluid is prevented from escaping past or penetrating the cut end of the hose.

In this specification, I have described a preferred form of my invention as applied to one particular type of hose. However, those skilled in the art will appreciate that my invention may be modified and may be applied to other types of hoses without departing from the spirit of my invention, and I therefore do not wish to be limited to the specific form described herein or in any manner other than by the claims appended hereto when given that range of equivalents to which my patent may be entitled.

The method disclosed herein is claimed in my divisional application Serial No. 3078, filed January 23, 1935.

I claim:

1. In combination, a coupling comprising a body portion, a sleeve projecting therefrom, a nipple concentric with the sleeve, said sleeve and said nipple defining an open ended annular chamber, a wall at the inner end of said chamber, said wall having an annular recess adjacent the sleeve, and a hose attached to said coupling and secured thereto between said sleeve and said nipple, said sleeve having a portion adjacent the open end of the chamber deformed inwardly to compress the hose between the sleeve and the nipple and to cause the material of the hose to flow into said annular recess, and having a portion adjacent said wall deformed inwardly to collapse the walls of said recess and to compress the material of the hose therein.

2. In combination, a coupling comprising a body portion, a sleeve projecting therefrom, a nipple concentric with the sleeve, said sleeve and said nipple defining an open ended annular chamber, a wall at the inner end of said chamber, said wall having a V-shaped annular recess adjacent the sleeve, and a hose attached to said coupling and secured thereto between said sleeve and said nipple, some of the material of the end of the hose projecting into said recess, said sleeve having a portion adjacent said wall deformed inwardly to collapse the walls of said recess and to compress the material of the hose therein.

3. In combination, a coupling comprising a body portion, a sleeve projecting therefrom, a nipple concentric with the sleeve, said sleeve and said nipple defining an open ended annular chamber, a wall at the inner end of said chamber, said wall having an annular recess therein, and a hose attached to said coupling and secured thereto between said sleeve and said nipple, some of the material of the end of the hose projecting into said recess, said sleeve having a portion adjacent said wall deformed inwardly to collapse the walls of said recess and to compress the material of the hose therein.

4. A hose coupling comprising a body portion having a sleeve, a chamber within the sleeve adapted to receive a hose, and an end wall at the base of said chamber, said end wall having an annular recess therein, said recess being adapted to receive material of the end of the hose and said recess being adjacent the sleeve whereby the walls of the recess can be deformed to pinch the material of the hose by the application of radial pressure to the exterior of the sleeve.

5. A hose coupling comprising a body portion having a sleeve and a nipple projecting therefrom and forming an annular chamber adapted to receive a hose, and an end wall at the base of said annular chamber, said end wall having a substantially radial portion and an annular recess therein, said recess being adapted to receive material of the end of the hose and said recess being adjacent the sleeve whereby the walls of the recess can be swung together to pinch the material of the hose by the application of radial pressure to the exterior of the sleeve.

6. A hose coupling comprising a body portion having a sleeve and a nipple projecting therefrom and forming an annular chamber adapted to receive a hose, and an end wall at the base of said annular chamber, said end wall having an annular V-shaped recess therein, said recess being adapted to receive material of the end of the hose and said recess being adjacent the sleeve whereby the walls of the recess can be swung together to pinch the material of the hose by the application of radial pressure to the exterior of the sleeve.

7. In combination, a coupling comprising a body portion, a sleeve formed integrally therewith and projecting therefrom, a nipple concentric with the sleeve, said sleeve and said nipple defining an open ended annular chamber, an end wall at the inner end of said chamber, and a hose attached to said coupling and secured thereto between said sleeve and said nipple, said sleeve having a portion adjacent the open end of the chamber deformed inwardly to compress the hose between the sleeve and the nipple, and having a portion adjacent said body portion deformed inwardly to compress the material of the hose against the nipple and against said end wall.

HENRY D. STECHER.